(12) United States Patent
Kato

(10) Patent No.: US 6,728,812 B1
(45) Date of Patent: Apr. 27, 2004

(54) PORTABLE INFORMATION TERMINAL

(75) Inventor: Yuichi Kato, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/445,829

(22) PCT Filed: Jun. 16, 1997

(86) PCT No.: PCT/JP97/02068

§ 371 (c)(1),
(2), (4) Date: Dec. 14, 1999

(87) PCT Pub. No.: WO98/58307

PCT Pub. Date: Dec. 23, 1998

(51) Int. Cl.[7] .............................................. G06F 13/00
(52) U.S. Cl. ...................................... 710/303; 711/152
(58) Field of Search ................................ 711/152, 163, 711/103; 710/316, 301–304

(56) References Cited

U.S. PATENT DOCUMENTS

| | | | | |
|---|---|---|---|---|
| 4,744,078 A | * | 5/1988 | Kowalczyk ................. 370/364 |
| 4,868,376 A | | 9/1989 | Lessin et al. | |
| 5,014,191 A | * | 5/1991 | Padgaonkar et al. ........ 711/163 |
| 5,440,748 A | * | 8/1995 | Sekine et al. ................ 710/303 |
| 5,522,089 A | * | 5/1996 | Kikinis et al. ................. 710/73 |
| 5,590,377 A | * | 12/1996 | Smith .......................... 710/22 |
| 5,600,800 A | | 2/1997 | Kikinis et al. | |
| 5,664,228 A | | 9/1997 | Mital | |
| 5,666,495 A | * | 9/1997 | Yeh .............................. 710/303 |
| 5,721,835 A | * | 2/1998 | Niwa et al. .................. 710/303 |
| 5,794,054 A | * | 8/1998 | Le et al. ..................... 710/240 |
| 5,798,951 A | * | 8/1998 | Cho et al. ................... 361/683 |
| 5,819,052 A | * | 10/1998 | Sonoda ........................ 710/107 |
| 5,845,282 A | * | 12/1998 | Alley et al. ................... 707/10 |
| 5,860,099 A | * | 1/1999 | Milios et al. ................ 711/103 |
| 5,999,997 A | * | 12/1999 | Pipes ........................... 710/10 |
| 6,119,237 A | * | 9/2000 | Cho ............................ 710/303 |
| 6,209,105 B1 | * | 3/2001 | Hamamoto .................. 710/303 |
| 6,532,587 B1 | * | 3/2003 | Sakai et al. .................. 717/168 |
| 2002/0095545 A1 | * | 7/2002 | Dalvi et al. ................. 711/103 |

FOREIGN PATENT DOCUMENTS

| | | | |
|---|---|---|---|
| EP | 492450 A2 | * 7/1992 | ......... G06K/19/073 |
| JP | 63-58520 | 3/1988 | |
| JP | 8-147428 | 6/1996 | |
| JP | 08314885 A | * 11/1996 | ........... G06F/15/78 |

* cited by examiner

Primary Examiner—Paul R. Myers
(74) Attorney, Agent, or Firm—Finnegan, Henderson, Farabow, Garrett & Dunner, L.L.P.

(57) ABSTRACT

A portable information terminal has at least a programming ROM, a work RAM, a data storage memory, an input key, a liquid crystal display panel, a liquid crystal driving control circuit, a built-in battery, and a central processing unit which is operated by using the programming ROM and the work RAM and displays data in the data storage memory on the liquid crystal display panel. Further, the portable information terminal comprises a switching control circuit which outputs a switching signal in accordance with an input signal from an external computer apparatus connected to the terminal, a control signal switching circuit which switches an address bus, a data bus and memory control signal lines which are connected to the central processing unit to an address bus, a data bus and memory control signal lines which are connected to the external computer apparatus in accordance with the switching signal in order to access the data storage memory from the external computer apparatus, and a serial signal switching circuit which switches a PCMCIA bus control signal to a serial signal in accordance with an input signal from a serial interface device which is connected between the portable information terminal and the external computer apparatus. Still further, the portable information terminal comprises a recognition circuit which recognizes the serial interface device and a PCMCIA standard female connector which is connected to the serial connector which is connected to the serial interface device.

9 Claims, 14 Drawing Sheets

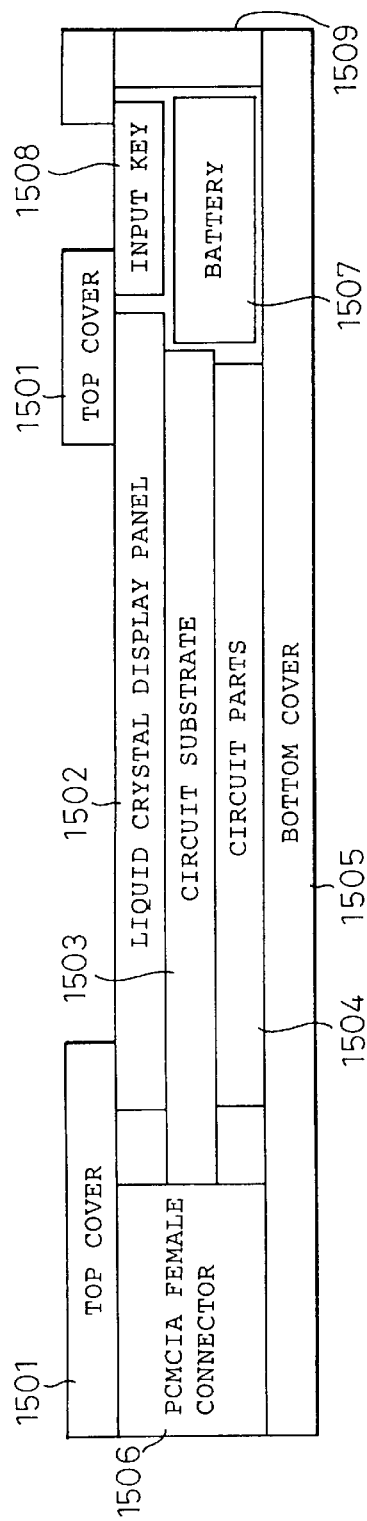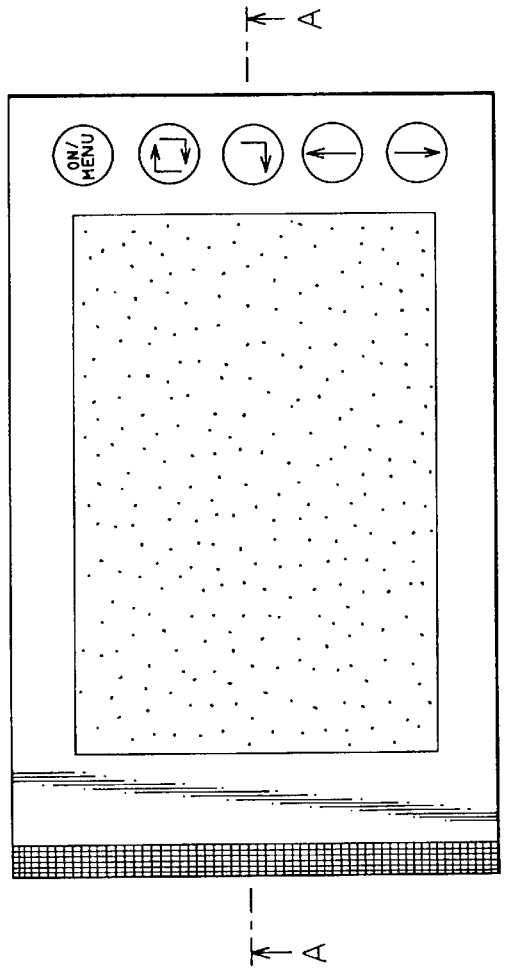

PORTABLE INFORMATION TERMINAL

TECHNICAL FIELD

The present invention relates to a portable information terminal, particularly, relates to a personal portable information terminal constituted by a PC card type which is driven by a built-in battery.

BACKGROUND ART

Recently, high performance and down-sizing have been rapidly developed in computers and peripheral apparatuses. As a result, conventional desk-top type information terminals are also tended to be directed to miniaturization which is convenient for portable.

For example, recently, personal portable information terminals (below, "portable terminal") which are called "electronic notebook", "palm-top computer", "personal digital assistant (PDA)", etc., have been produced.

In this case, the above PDA represents a personal information apparatus which can be easily carried, and comprises a pen-input function, a data communication function, etc., based on functions contained in a conventional notebook (a notebook made of paper), such as a schedule management, an address book, a memo-randum, etc. In the market, there are well-known types, i.e., a "Newton" published on 1993 from Apple Co., Ltd. in U.S. and a "Zaurus" from Sharp Co., Ltd. in Japan.

In the above portable terminal, a software which is called "Personal Information Manager (PIM)" and executes schedule management, an address book, a telephone book, a memo random, etc., has been already installed, and comprises a data searching functions and a data transmission/reception function by connecting an external apparatus, so that the portable terminal has merits which are not contained in the conventional notebook (i.e., a notebook made of paper).

As mentioned above, the PIM is a tool for managing personal information, and is a kind of software for executing the schedule management, the address book, a project management, etc. Further, the PIM may represent a portable terminal itself having functions as well as the electronic notebook, the palm-top computer, the PDA, etc.

In the above mentioned conventional portable terminals, a key board, which is in general used in a personal computer or a word processor, is eliminated in order to attach importance to portability, and another input means is combined thereto instead of the keyboard.

As the above input means, the following methods are used in general.

(1) a method for arranging a small number of input keys, and inputting predetermined instructions based on sets of two or more input keys;

(2) another method for displaying a software keyboard on a display having a touch panel, and inputting instructions through the software keyboard; and (3) still another method for inputting characters with handwriting on the touch panel, executing character recognition, determining and executing an input instructions.

As mentioned above, although the conventional portable terminals have various input means, these input means have various bad handling operations when using them. That is, (1) When inputting instructions by a user, characters must be input through a small input key one by one by using a pen or finger, so that there are problems in which input operations become complicated and a lot of time is required when inputting characters.

(2) In the method for inputting characters with handwriting on the touch panel, there are problems in which a recognition rate of characters becomes insufficient and a lot of time and patience are required for handling many data.

(3) Further, in the conventional card type portable terminal, although a button type lithium battery is usually utilized in order to realize a thin terminal, there are problems in which a battery capacity is insufficient for power consumption in the CPU and the liquid crystal display panel so that a lifetime of the battery becomes short and it is impossible to continuously use it for a long time.

DISCLOSURE OF THE INVENTION

The object of the present invention is to provide a new personal portable information terminal having a PC card type which can resolve the above mentioned conventional problems and, according to the present invention, in actual use, it is possible to realize ease of input of instructions and data from the user and good portability, and to achieve long operations by using a battery having a small capacity.

In accordance with the present invention, there is provided a portable information terminal at least including a programming ROM, a work RAM, a data storage memory, an input key, a liquid crystal display panel, a liquid crystal driving control circuit, a built-in battery, and a central processing unit which is operated by using the programming ROM and the work RAM and displays data in the data storage memory on the liquid crystal display, including:

a switching control circuit for outputting a switching signal in accordance with an input signal from an external computer apparatus connected to the portable information terminal;

a control signal switching circuit which switches an address bus, a data bus and memory control signal lines which are connected to the central processing unit, to an address bus, a data bus and memory control signal lines which are connected to the external computer apparatus, in accordance with the switching signal, in order to access the data storage memory from the external computer apparatus; and a PCMCIA standard female connector which is connected to the external computer apparatus;

and further including:

a serial signal switching circuit which switches a PCMCIA bus control signal to a serial signal in accordance with an input signal from a serial interface device connected between the portable information terminal and the external computer apparatus; and a recognition circuit which recognizes the serial interface device.

As a preferred embodiment, a portable information terminal further includes a power source switching circuit for switching a power source signal between the built-in battery and the external computer apparatus, when the switching signal is input thereto.

As another preferred embodiment, a portable information terminal further includes a power source switching circuit for switching a power source signal between the built-in battery and the serial interface device in accordance with the input signal.

As still another preferred embodiment, the serial interface device includes at least a serial connector, a voltage transformer, a PCMCIA standard male connector, a waveform generating circuit, a power source, and two sets of input/output signal terminals;

the portable information terminal having a PCMCIA female connector is connected to one of the two sets of input/output signal terminals, and the external computer apparatus is connected to the other of two sets of input/output signal terminals; and a serial signal is transmitted/received between the portable information terminal and the external computer apparatus.

As still another preferred embodiment, a serial signal having different data bit length and transfer rate between an input signal and an output signal is transmitted/received between the portable information terminal and the external computer apparatus.

As still another preferred embodiment, the liquid crystal driving control circuit, the switching control circuit and the control signal switching circuit are integrated to one chip semiconductor in order to constitute an ASIC.

As still another preferred embodiment, the liquid crystal driving control circuit, the switching control circuit, the control signal switching circuit, the serial signal switching circuit and the recognition circuit are integrated to one chip semiconductor in order to constitute an ASIC (Application Specific Integrated Circuit).

As still another preferred embodiment, the data storage memory comprises an SRAM or a flash memory.

As still another preferred embodiment, the programming ROM comprises a mask ROM or a flash memory.

As still another preferred embodiment, the built-in battery comprises two lithium coin batteries which are connected in series.

As still another preferred embodiment, the liquid crystal display panel comprises an STN monochrome reflection panel or an STN color reflection panel.

As still another preferred embodiment, a top cover is arranged on the display side of the liquid crystal display panel, a circuit substrate is arranged at the rear side of the liquid crystal display panel, circuit parts are arranged on the surface opposite to the liquid crystal display panel of the circuit substrate, and a bottom cover is arranged in order to protect the circuit parts, so that the portable information terminal is formed of five layers.

As still another preferred embodiment, sizes of an outer and a thickness of the portable information terminal are defined based on a PCMCIA standard type II.

BRIEF DESCRIPTION OF THE DRAWINGS

FIG. 15(b) is a schematic front view of the portable terminal according to the present invention, and FIG. 15(a) is a schematic side view along A—A cross-sectional view in FIG. 15(b).

BEST MODE OF CARRYING OUT THE INVENTION

Figure 1:
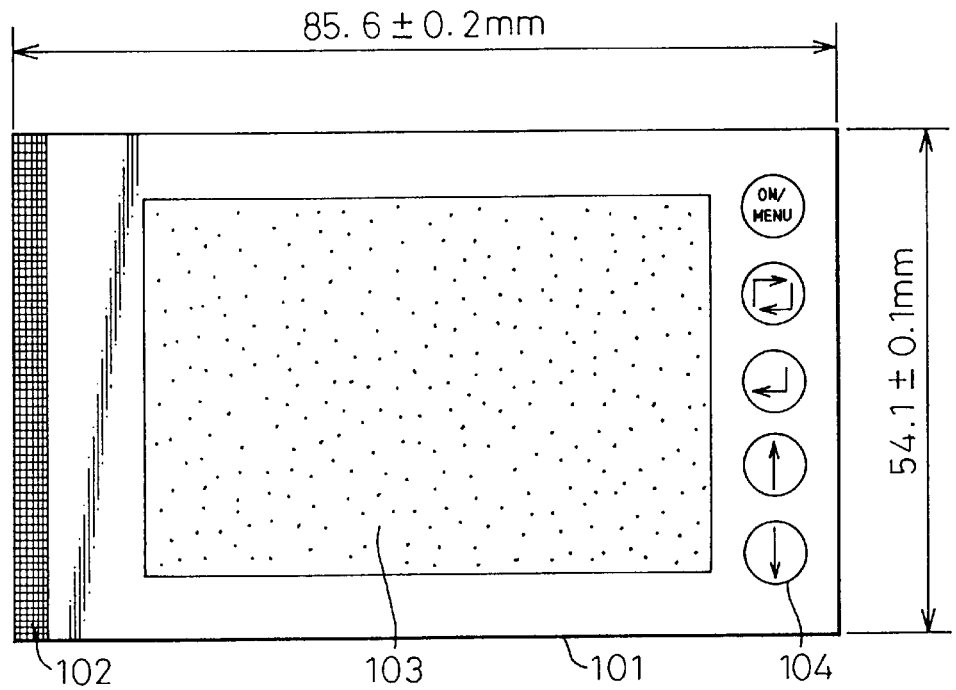
FIG. 1 is an external appearance and front view of a personal portable information terminal (below "Portable terminal") according to an embodiment of the present invention.

FIG. 1 is the external appearance and front view of the personal portable information terminal (below "portable terminal") according to the embodiment of the present invention. The embodiment of the present invention will be explained with reference to the attached drawings.

The PC card type portable terminal according to the present invention is basically constituted by a case 101, a connector 102, and various kinds of input keys 104. An outer size of the case 101 is defined based on the type II in PCMCIA (Personal Computer Memory Card International Association) standard or JEIDA (Japanese Electronic Industry Development Association) standard, and has a size of length (54.1±0.1 mm)×width (85.6±0.2 mm)×thickness (5.0 mm). As mentioned above, since the portable terminal according to the present invention is formed of so called "business card size", it has a very high portability.

Further, the connector 102 is used as a connection terminal to be electrically connected to the external computer apparatus as mentioned below, and is formed of a PCMCIA standard female connector having 68 pins based on the above-mentioned PCMCIA standard or JEIDA standard.

In this case, the PC card is a card type peripheral device for personal computer which is conventionally called "IC memory card", and is standardized by the PCMCIA in U.S. and the JEIDA in Japan. In Japan, this is constituted by incorporated specifications of socket service, card service, an ATA card, and an AIMS card into the PC card guide line (Ver. 4.1) standard on October 1993, and this corresponds to the PCMCIA (Ver. 2.1) standard in U.S. As PC card products, various products, for example, a memory card, a hard disk card, a modem card, a LAN card, an I/O interface card, a sound card, etc. are available in the market.

The liquid crystal display panel 103 is used as a data display, and is formed of either an STN monochrome reflection type or an STN color reflection type having the number of pixels of 160×100. The number of pixels indicates that, in the case of display of an alphabet and numeral of 6×10 fonts, it is possible to display the number of characters of 26 rows×10 columns on the liquid crystal display panel 103.

The input key 104 is used as a power switch key, a cursor key to perform cursor operation on the liquid display panel 103, and an input key to select the PIM software or menu.

Figure 2:
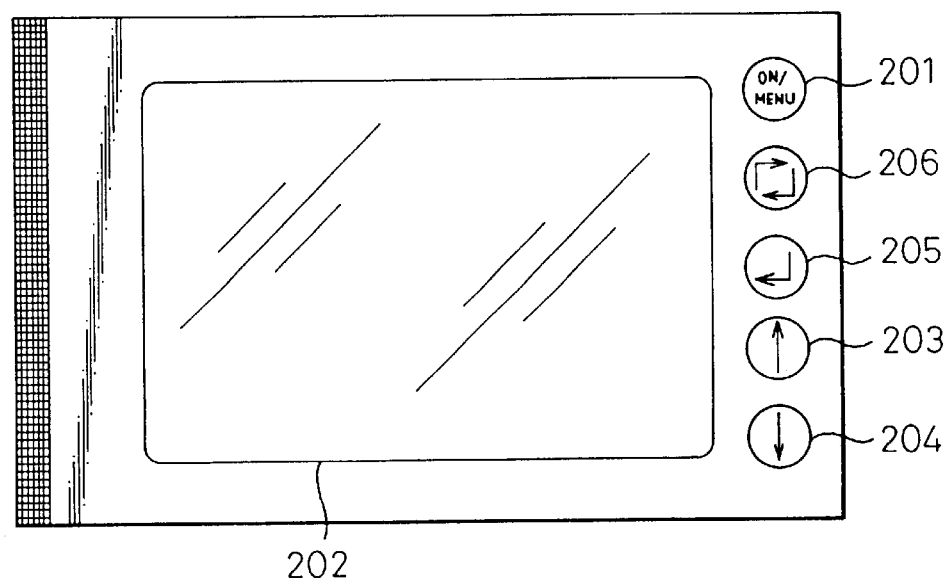
FIGS. 2 and 3 are external appearance views for explaining a state of display image when the portable terminal according to the present invention is independently used by a user.
Figure 3:
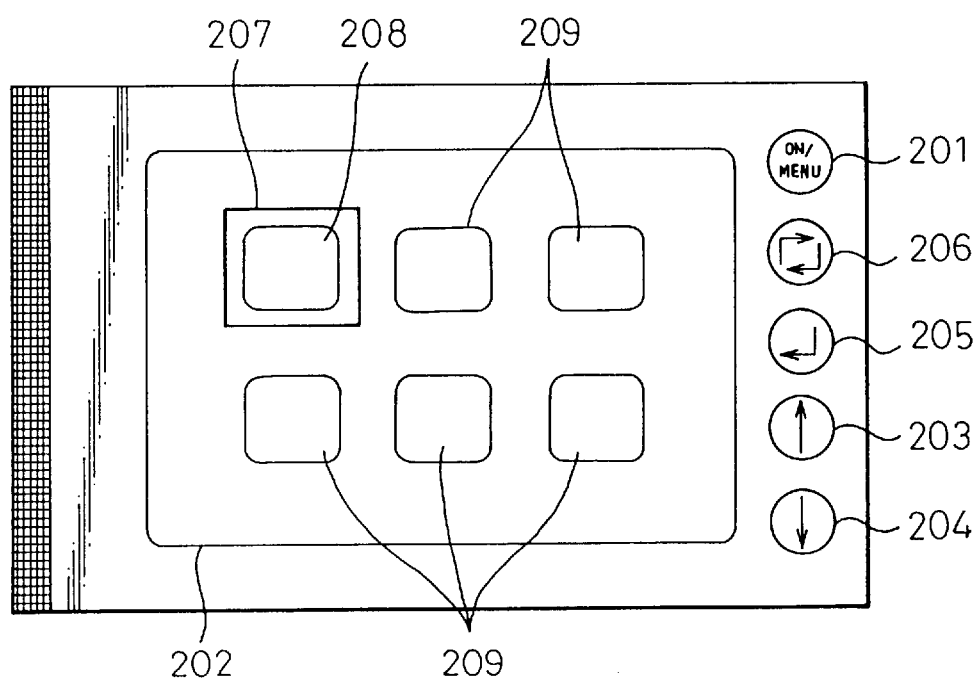

FIGS. 2 and 3 are external appearance views for explaining a state of display image when the portable terminal according to the present invention is independently used by a user. FIG. 2 shows display state before power-on, and FIG. 3 shows display state after power-on, and shows the menu which is displayed at first.

An ON/OFF key 201 is a power switch in FIG. 2, and is formed of a toggle switch for changing over on/off of the power source of the portable terminal. Since FIG. 2 shows the before power-on state, no images are displayed on the liquid display panel 202.

An upper cursor key 203 and a lower cursor key 204 in FIG. 3 are used as cursor keys to move the cursor 207 toward either up and down, or left and right on the liquid display panel 202. An enter key 205 is used as an enter key to determine an application software or to input the data. Further, a mode key 206 is used as a key to change over the display image in the application software.

A plurality of icons each corresponding to the application software, for example, an address book, a schedule book, a watch, a memo book, etc., are shown on the liquid display panel 202 in FIG. 3. For example, the icon 208 is selected by the cursor key, and the icon 209 lies in non-selected state. The cursor 207 is put on the icon of the address book in this example.

Figure 6:
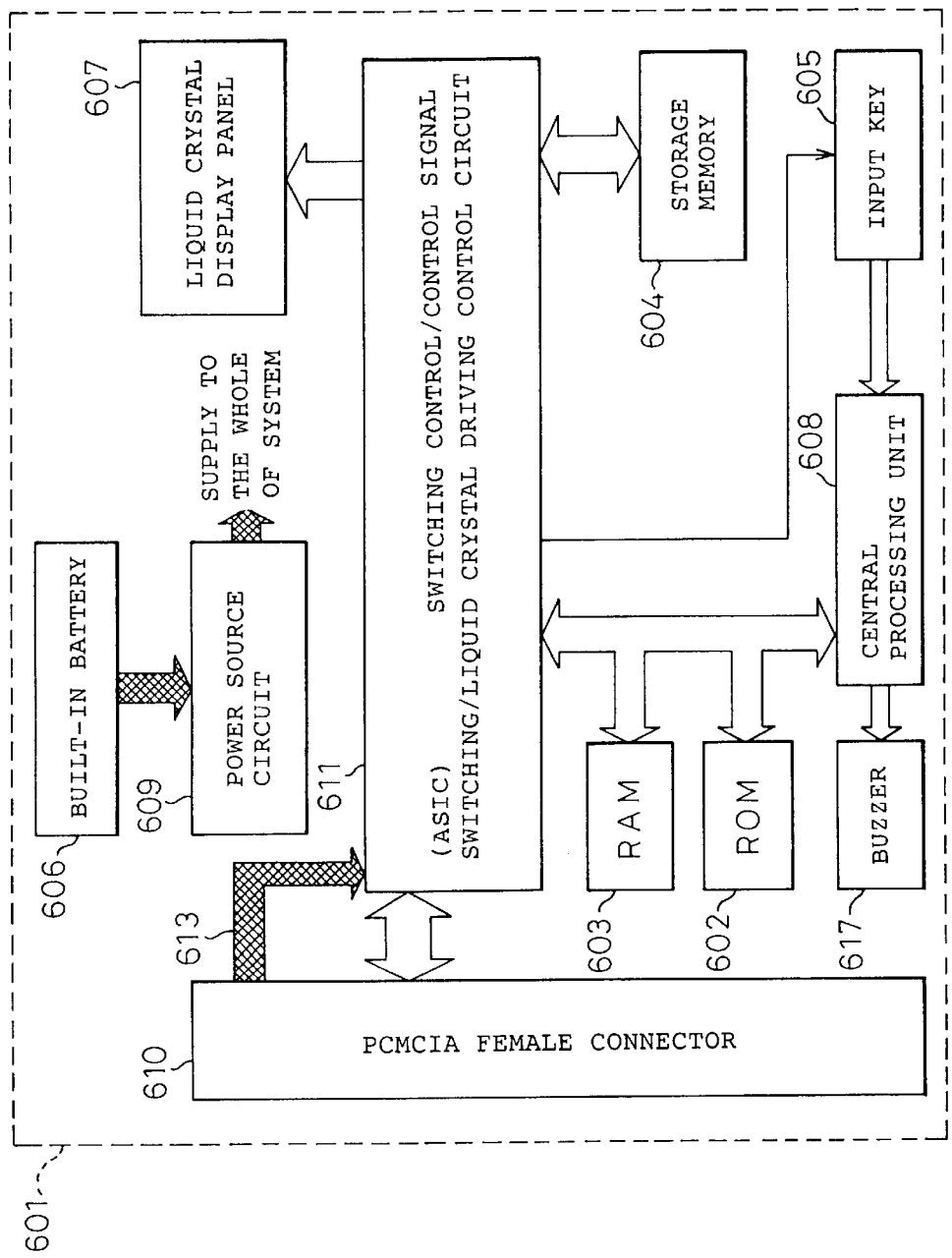
FIG. 6 is a circuit block diagram of the portable terminal shown in FIG. 1.

Accordingly, in the external appearance view shown in FIG. 3, since the cursor 207 is put on the icon of the address book, when pushing the enter key 205, the address book is loaded from the programming ROM 602 in FIG. 6 so that it is started.

Figure 4:
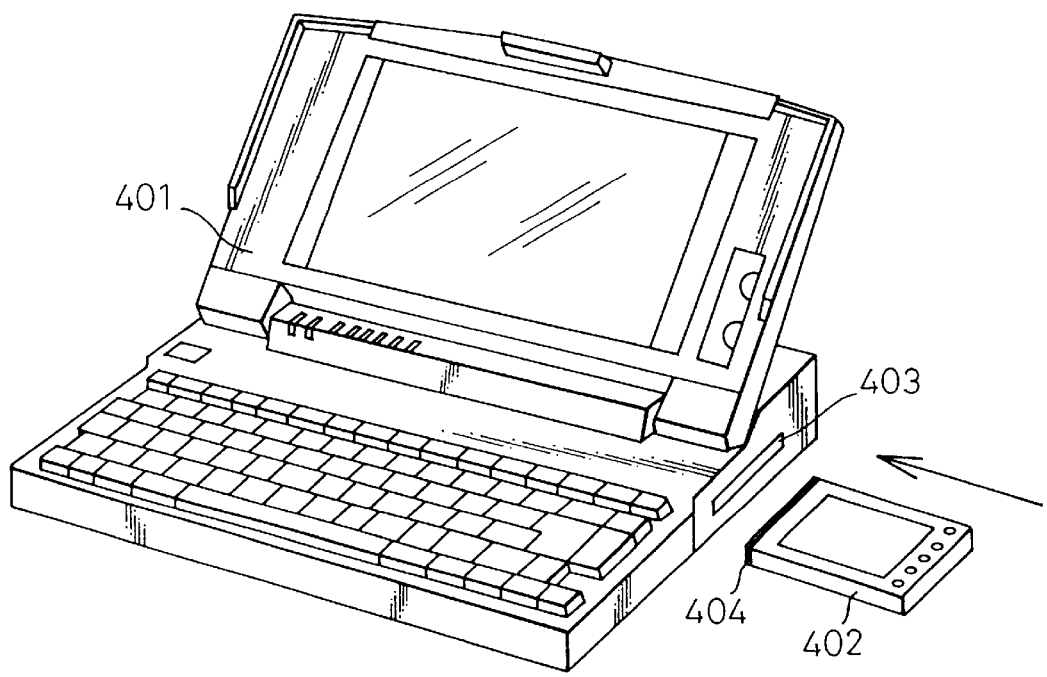
FIG. 4 is an explanatory view for explaining connection when the portable terminal according to the present invention is connected to an external computer apparatus.

FIG. 4 is an explanatory view for explaining connection when the portable terminal according to the present invention is connected to an external computer. As shown in the drawing, the portable terminal 402 according to the present invention is inserted to a PCMCIA card slot 403 in a note type personal computer 401. The 68-PIN male connector based on the PCMCIA standard is provided to an internal side of the PCMCIA card slot 403 in the note type personal computer 401. Further, the portable terminal 402 according to the present invention has the 68-PIN female connector 404 based on the PCMCIA standard. When the 68-PIN PCMCIA female connector 404 is inserted to the PCMCIA card slot 403, it is connected to the 68-PIN male connector in the personal computer 401.

In the above-explanations, although the note type personal computer is used as the external computer apparatus, a desk-top type personal computer may be used if it has the PCMCIA slot therein.

Figure 5:
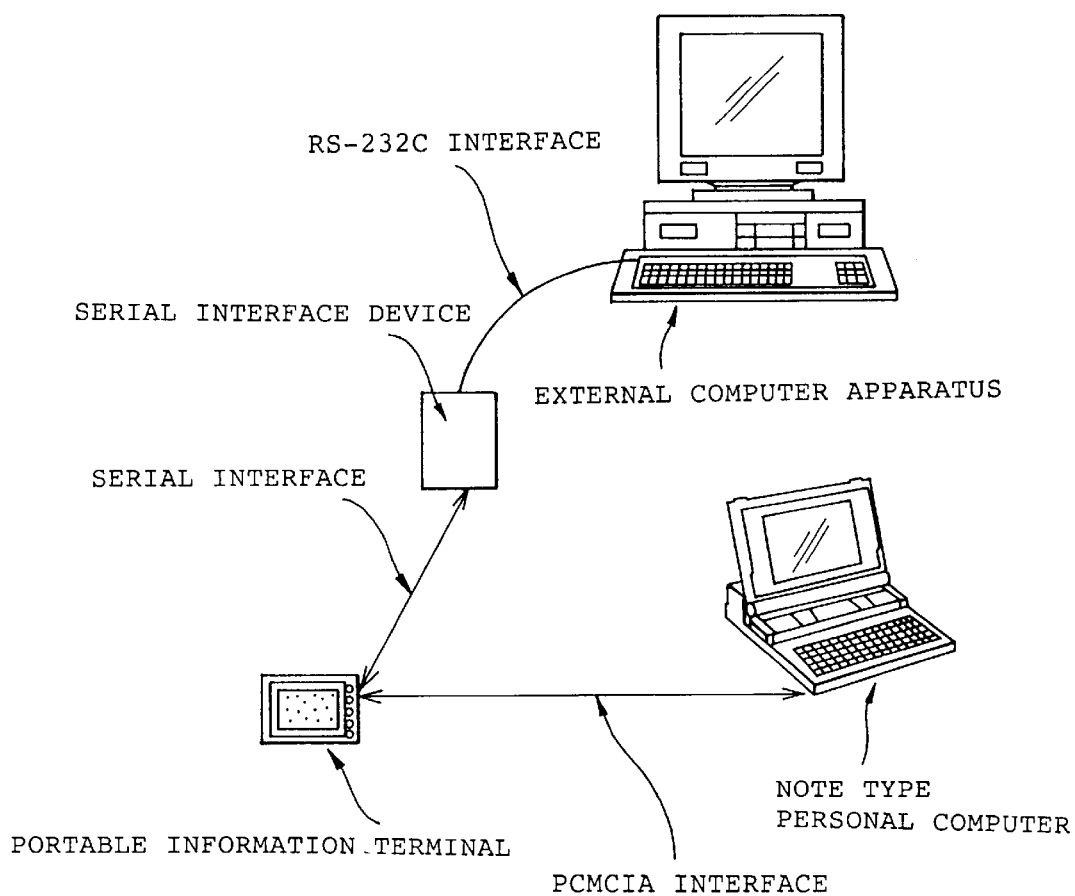
FIG. 5 is an explanatory view for explaining connection of the portable terminal according to the present invention to a serial interface device, an external computer apparatus, and a note type personal computer.

FIG. 5 is an explanatory view for explaining connection of the portable terminal according to the present invention, to the serial interface device, the external computer apparatus, and the note type personal computer. As explained in FIG. 4, when the portable terminal according to the present invention is inserted to the note type personal computer through the PCMCIA interface, the portable terminal picks up the internal data from the personal computer. Further, when the portable terminal is connected to the external computer apparatus through the serial interface device mentioned below, it also picks up the internal data from the external computer apparatus.

FIG. 6 is a circuit block diagram of the portable terminal shown in FIG. 1. In FIG. 6, the portable terminal 601 according to the present invention is constituted by a programming ROM 602, a work RAM 603, a data storage memory 604, an input key 605, a built-in battery 606, a liquid crystal display panel 607, a central processing unit (below, CPU) 608 corresponding to a second control means (micro computer), a power source circuit 609, a PCMCIA standard female connector 610, and an ASIC (Application Specific Integrated Circuit) 611 corresponding to a first control means.

An address bus, a data bus and a memory control line of the programming ROM 602 and the work RAM 603 are connected to the CPU and the ASIC including a switching control circuit/a control signal switching circuit/a liquid drive control circuit/a serial signal switching circuit, etc. An address bus, a data bus and a memory control signal line of the data storage memory 604 are connected to the ASIC 611. Further, the liquid display panel 607 is connected to the ASIC 611. The power source circuit 609 is connected to the built-in battery 606 in order to supply the power to the whole of the portable terminal 601.

The input key which is operated by a user is connected to the CPU 608 and the ASIC 611. Further, a buzzer 617 is connected to the CPU 608.

Figure 7:
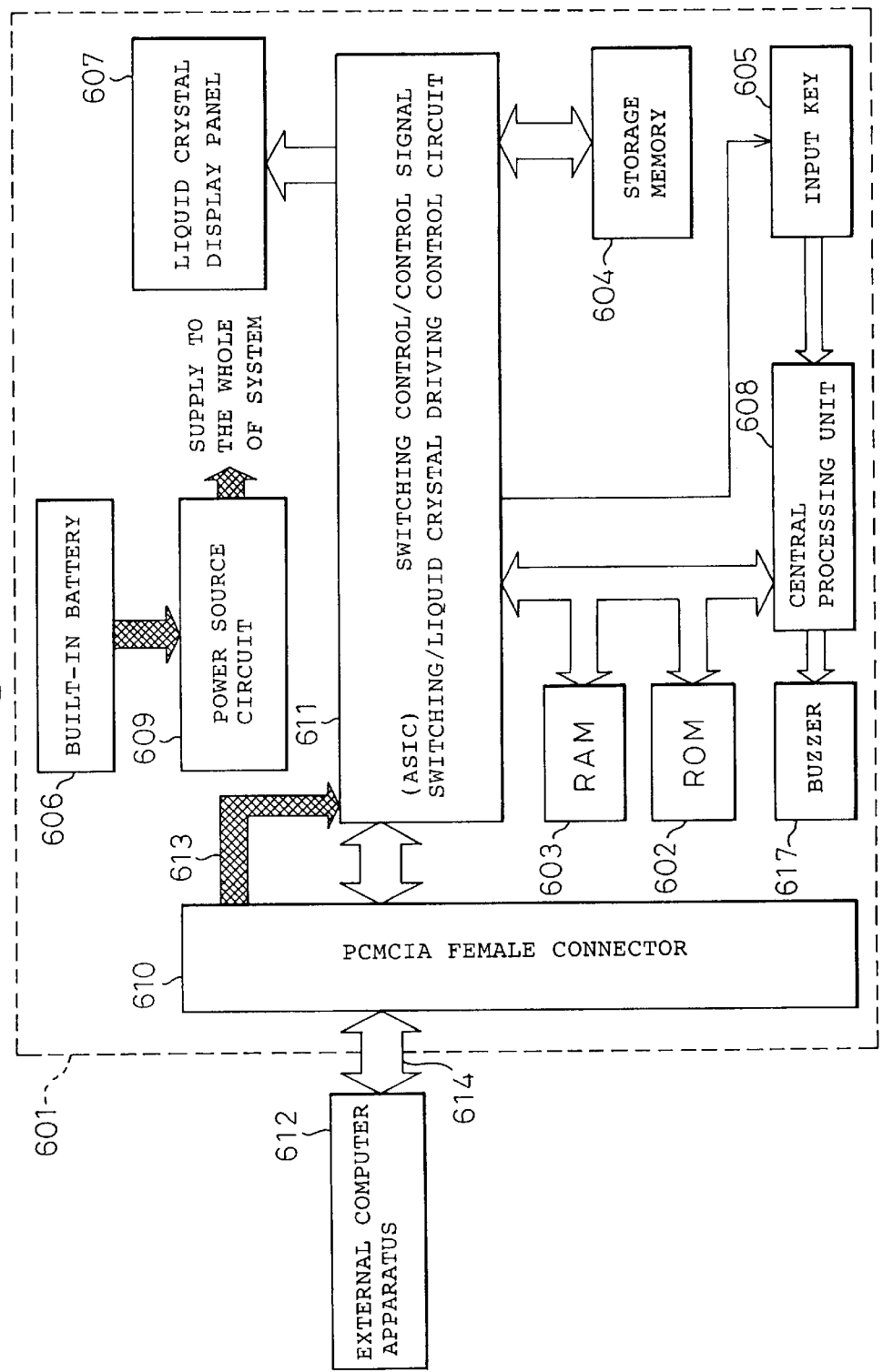
FIG. 7 is a circuit block diagram for explaining connection when the portable terminal 601 according to the embodiment of the present invention is connected to the external computer apparatus 612.

The ASIC 611 is connected to the PCMCIA female connector 610 which is connected to the external computer apparatus 612 as shown in FIG. 7.

Further, the ASIC 611 includes a liquid crystal drive control circuit for controlling the liquid crystal display panel 607; a switching control circuit for outputting a switching signal in accordance with an input signal from the external computer apparatus; and a control signal switching circuit for switching the address bus, the data bus and the memory control signal line from the CPU 608 to the address bus, the data bus and the memory control signal line from the external computer apparatus, in accordance with the switching signal, in order to access from the external computer apparatus to the data storage memory 604. The above-mentioned each circuit is integratedly constituted as the ASIC.

FIG. 7 is a circuit block diagram for explaining connection when the portable terminal 601 according to the embodiment of the present invention is connected to the external computer apparatus 612. In this circuit block diagram, the PCMCIA standard female connector 610 of the portable terminal 601 is connected to the PCMCIA standard male connector (see FIG. 4) of the external computer apparatus 612.

The signal line group 614 in the drawing shows the data bus, the address bus and the memory control signal line which are connected to the external computer apparatus 612, and connected to the data bus, the address bus and the memory control signal line of the data storage memory 604 through the ASIC 611 within the portable terminal 601.

When the PCMCIA standard female connector 610 of the portable terminal 601 is connected to the external computer apparatus 612 by inserting the portable terminal to the external computer apparatus by the user, the switching control circuit in the ASIC 611 outputs the switching signal in response to the power source signal 613 which is input from the external computer apparatus 612 through the PCMCIA standard female connector 610. When the control signal switching circuit in the ASIC 611 receives the switching signal, the control signal switching circuit switches the address bus, the data bus and the memory control signal line from the CPU 608 to the address bus, the data bus and the memory control signal line from the external computer apparatus 612. As a result, the access from the CPU 608 to the data storage memory 604 is halted so that it can be accessed from the external computer apparatus 612.

Further, when the user removes the portable terminal 601 from the external computer apparatus 612, the power source signal 613 becomes open state, and the switching control circuit in the ASIC 611 outputs the switching signal. When the control signal switching circuit receives the switching signal, the control signal switching circuit switches the address bus, the data bus and the memory control signal line from the external computer apparatus, to the address bus, the data bus and the memory control signal line from the CPU 608. As a result, the access from the external computer apparatus 612 to the data storage memory 604 is halted, so that it can be accessed from the CPU 608.

In the above explanation, although the power source signal is used for detecting the connection between the portable terminal 601 and the external computer apparatus 612, it is possible to utilize an output signal instead of the power-source signal.

As mentioned above, the portable terminal 601 according to the present invention is connected to the external computer apparatus 612 through the PCMCIA standard female connector, the data corresponding to the application software used in the portable terminal 601 is previously prepared in the external computer apparatus 612, and the prepared data is transferred to the data storage memory 604 in the portable terminal 601. As a result, it is possible to store the data which is prepared in the external computer apparatus 612, into the data storage memory 604. Accordingly, it is possible to easily acquire the latest data without complicated input operations of the data on the portable terminal 601 by the user.

After transfer of the data from the external computer apparatus 612 to the portable terminal 601, the user removes the portable terminal 601 from the external computer apparatus 612, and the newest data can be displayed on the liquid crystal display panel 607.

In the above explanations, although the data transfer is performed from the external computer apparatus to the portable terminal, it is possible to accumulate the data, which were previously prepared, through an input key of the portable terminal into the data storage memory, and to transfer the data from the portable terminal to the external computer apparatus.

Figure 8:
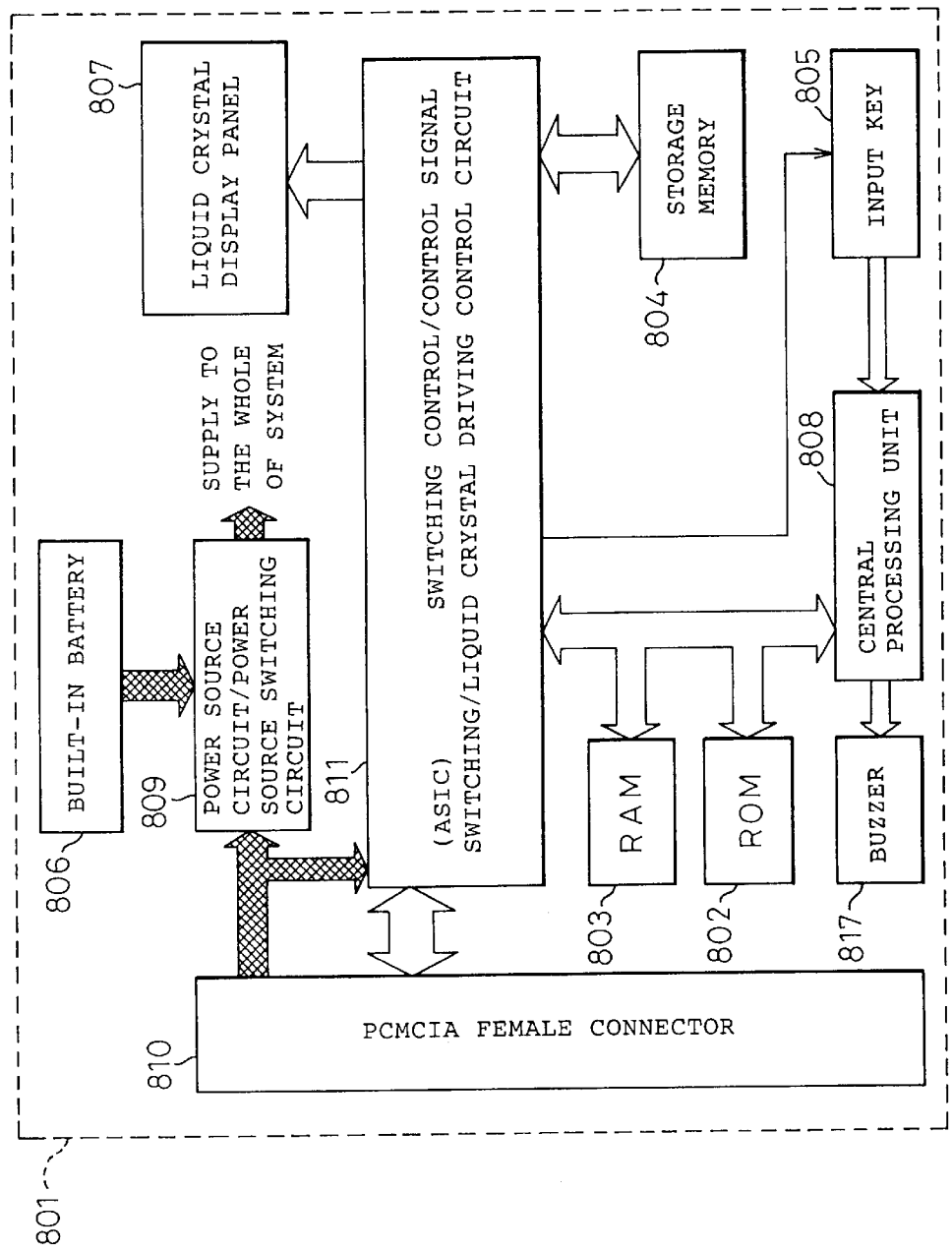
FIG. 8 is a circuit block diagram of the portable terminal according to a second embodiment of the present invention.

FIG. 8 is a circuit block diagram of the portable terminal according to the second embodiment of the present invention. The embodiment will be explained with reference to the drawings below.

The portable terminal 801 includes the programming ROM 802, the work RAM 803, the data storage memory 804, the input key 805, the built-in battery 806, the liquid crystal display panel 807, the CPU 808, a power source circuit/a power source switching circuit 809, the PCMCIA standard female connector 810, and the ASIC 811.

As shown in the drawing, as the difference from the first embodiment, this embodiment includes the power source switching circuit within the power source circuit, and the power source signal from the PCMCIA standard female connector 810 is input to the power source circuit/the power source switching circuit 809.

As well as the first embodiment, the address bus, the data bus and the memory control signal line for the programming ROM 802 and the work RAM 803 are connected to the CPU 808 and the ASIC 811. Further, the address bus, the data bus and the memory control signal line for the data storage memory 804 are connected to the ASIC 811. The liquid display panel 807 is connected to the ASIC 811, the power source circuit/the power source switching circuit 809 is connected to the built-in battery. 806. Further, the power source signal is output to the whole of the portable terminal 801.

Further, the input key 805 is connected to the CPU 808 and the ASIC 811. Still further, the buzzer 817 is connected to the CPU 808.

The PCMCIA standard female connector 810 which is connected to the external computer apparatus 812 is connected to the ASIC 811.

Further, the ASIC 811 includes a liquid crystal display panel drive circuit for controlling the liquid crystal display panel 807; a switching control circuit for outputting the switching signal in response to an input signal from the external computer apparatus; and a control signal switching circuit for switching the address bus, the data bus and the memory control signal from the CPU 808 to the address bus, the data bus and the memory control signal from the external computer apparatus, in response to the switching signal in order to access the data storage memory from the external computer apparatus.

Figure 9:
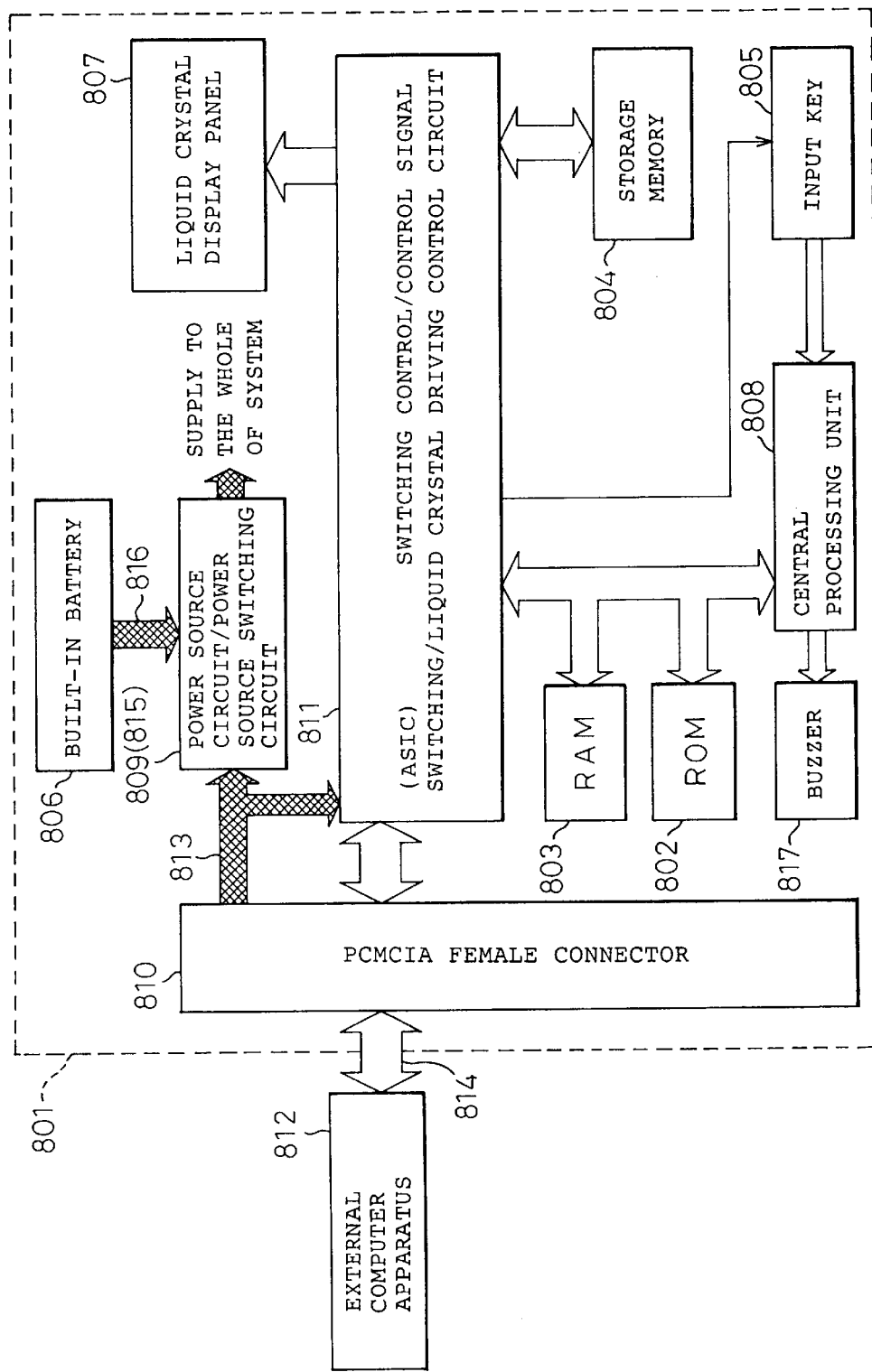
FIG. 9 is a circuit block diagram for explaining connection when the portable terminal 801 according to the second embodiment of the present invention is connected to the external computer apparatus 812.

FIG. 9 is a circuit block diagram for explaining connection when the portable terminal 801 according to the second embodiment of the present invention is connected to the external computer apparatus 812. In this structure, the PCMCIA standard female connector 810 of the portable terminal 801 is connected to the PCMCIA standard male connector (see FIG. 4) of the external computer apparatus 812.

In the drawing, the signal line 814 includes the data bus, the address bus and the memory control signal line from the external computer apparatus 812, and connected to the data bus, address bus and the memory control signal line for the data storage memory 804 in the portable terminal 801 through the ASIC 811.

When the PCMCIA standard female connector 810 of the portable terminal 801 is connected to the external computer apparatus 812 by the user, the switching control circuit in the ASIC 811 outputs the switching signal in response to the power source signal 813 which is input from the external computer apparatus 812. When the control signal switching circuit receives the switching signal, the control signal switching circuit switches the address bus, the data bus and the memory control signal line from the CPU 808, to the address bus, the data bus and the memory control signal line from the external computer apparatus 812. As a result, the access from the CPU 808 to the data storage memory 804 is halted so that it can be accessed from the external computer apparatus 812.

Further, when the user removes the portable terminal 801 from the external computer apparatus 812, the power source signal becomes open state so that the switching control circuit in the ASIC 811 outputs the switching signal. When the control signal switching circuit receives the switching signal, the control signal switching circuit switches the address bus, the data bus and the memory control signal line from the external computer apparatus 812, to the address bus, the data bus and the memory control signal line from the CPU 808. As a result, the access from the external computer apparatus 812 to the data storage memory 804 is halted so that it can be accessed from the CPU 808.

In this embodiment, the power source signal 813 is input from the external computer apparatus 812 to the power source switching unit 815 within the power source circuit/the power source switching circuit 809. The power source switching unit 815 is connected to the PCMCIA standard female connector 810, the built-in battery 806, and the ASIC 811. When the PCMCIA standard female connector 810 in the portable terminal 801 is connected to the external computer apparatus 812 by the user, the power source switching unit 815 cuts off the power source signal 816, which is output from the built-in battery 806, in response to the power source signal 813 which is output from the external computer apparatus 812. As a result, the power source signal 813 which is output from the external computer apparatus 812 is output to the whole of the portable terminal 801 so that it is possible to save power consumption of the built-in battery 806.

On the other hand, when the user removes the portable terminal 801 from the external computer apparatus 812, the power source signal 813 becomes open state. As a result, the power switching unit 815 outputs the power source signal 816 from the built-in battery 806 to the hole of the portable terminal 801.

In the above explanations, although the power source signal is used for detecting the connection between the portable terminal 801 and the external computer apparatus 812, it is possible to utilize another output signal instead of the power source signal.

Figure 10:
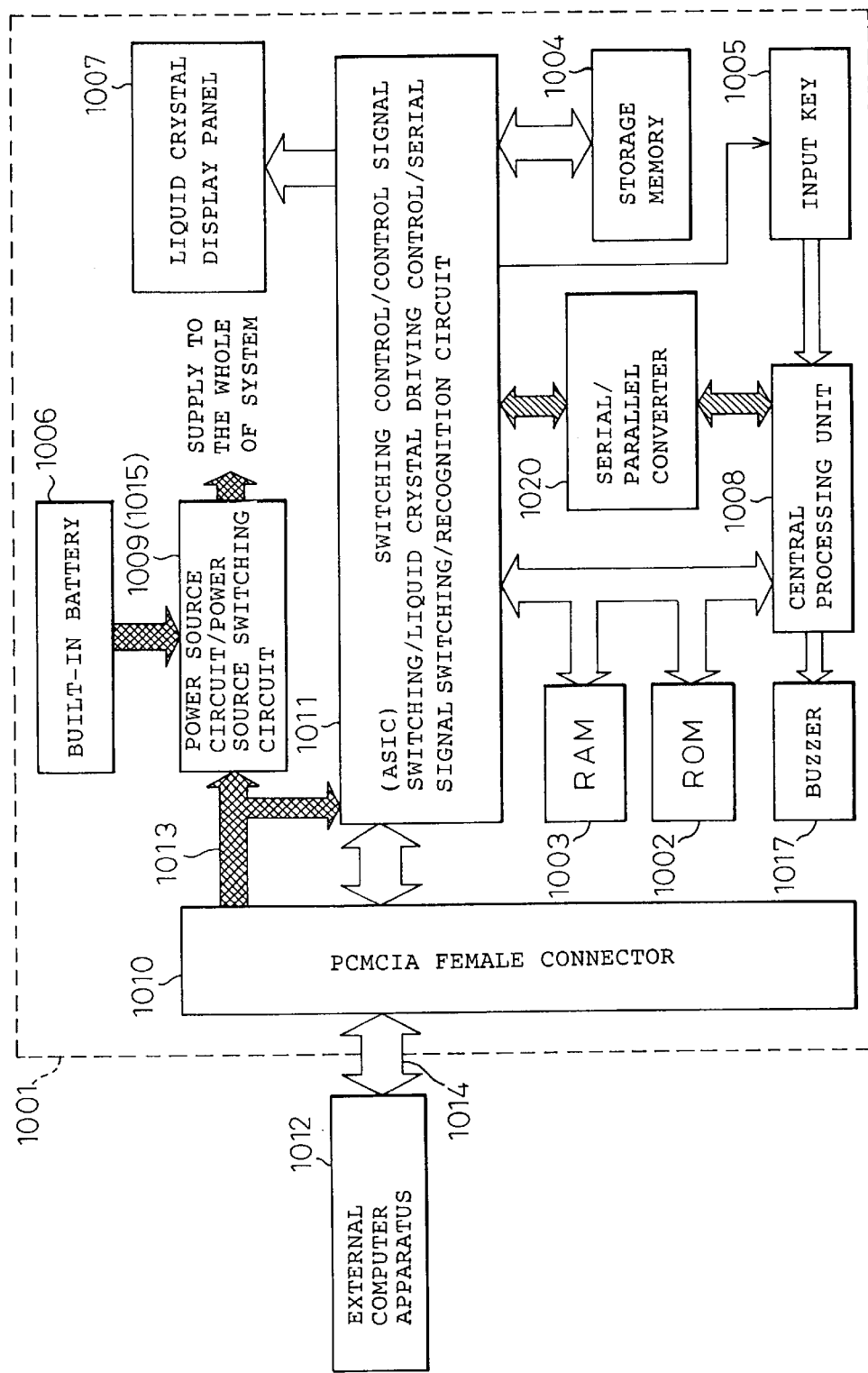
FIGS. 10 and 11 are circuit block diagrams of the portable terminal according to a third embodiment of the present invention.
Figure 11:
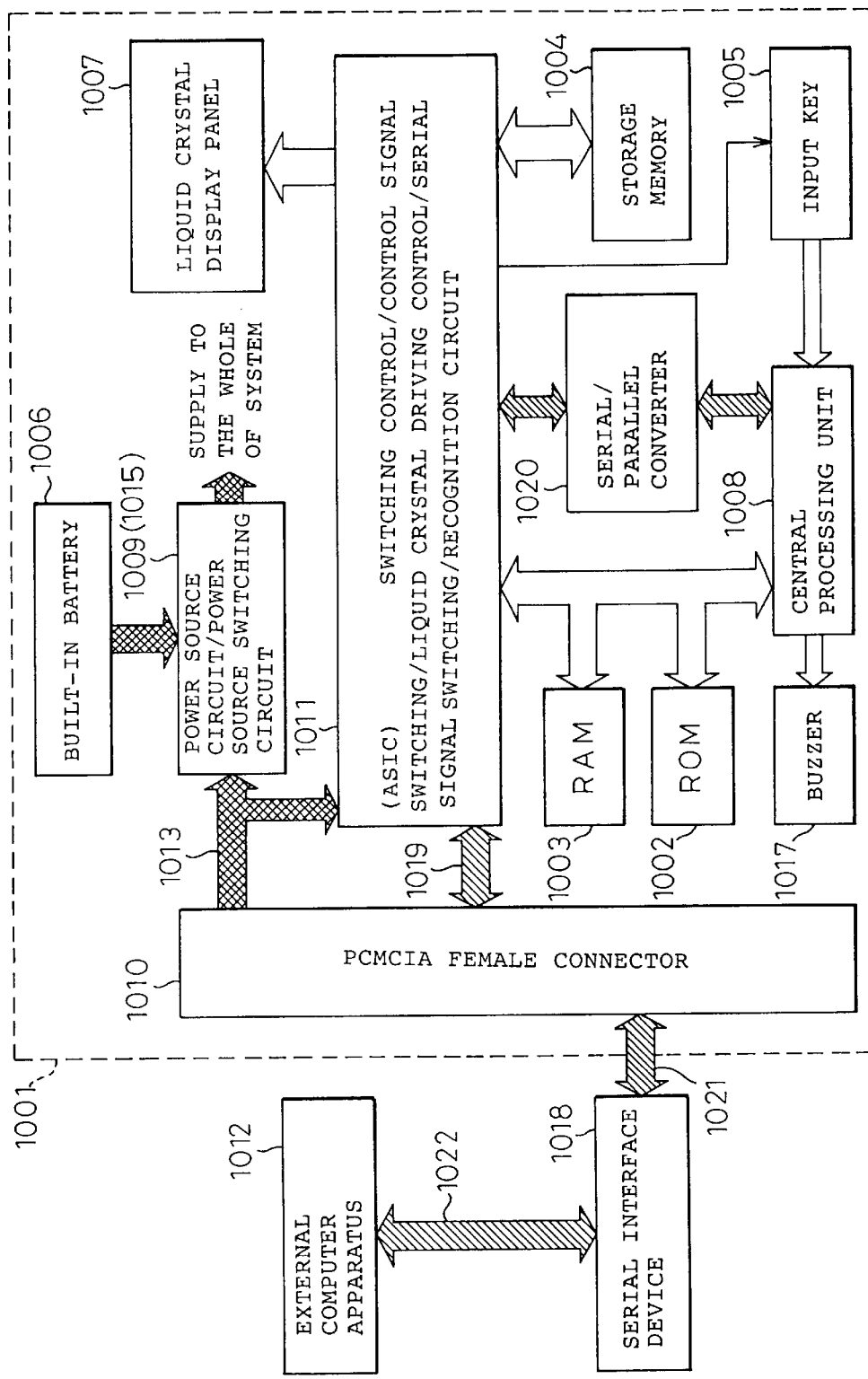

FIGS. 10 and 11 are circuit block diagrams of the portable terminal according to a third embodiment of the present invention. The embodiment will be explained with reference to the drawings below.

As shown in FIG. 10, the portable terminal 1001 includes the programming ROM 1002, the work RAM 1003, the data storage memory 1004, the input key 1005, the built-in battery 1006, the liquid crystal display panel 1007, the CPU 1008, the power source circuit/the power source switching circuit 1009, the PCMCIA standard female connector 1010, the ASIC 1011, and a serial/parallel converting circuit 1020. Further, as shown in FIG. 11, the PCMCIA standard female connector 1010 is connected to a serial interface apparatus 1018.

As shown in the drawing, the address bus, the data bus and the memory control from the programming ROM 1002 and the work RAM 1003 are connected to the CPU 1008 and the ASIC 1011. The address bus, the data bus and the memory control signal line from the data storage memory 1004 are connected to the ASIC 1011. The liquid crystal display panel 1007 is connected to the ASIC 1011, and the power source/power source switching circuit 1009 is connected to the built-in battery 1006 so that the power source signal is output to the whole of the portable terminal 1001.

Further, the input key 1005 is connected to the CPU 1008 and the ASIC 1011. The buzzer 1017 is connected to the CPU 1008. The PCMCIA standard female connector 1010 which is connected to the external computer apparatus 1012 is connected to the ASIC 1011.

Further, the ASIC 1011 includes the liquid crystal drive control circuit for controlling the liquid crystal display panel 1007; the control signal switching circuit for switching the address bus, the data bus and the memory control signal line from the CPU 1008, to the address bus, the data bus and the memory control signal line from the external computer apparatus, in response to the switching signal in order to access from the external computer apparatus to the data storage memory; the serial signal switching circuit for switching the PCMCIA bus control signal to the serial signal 1021 in response to the input signal from the serial interface apparatus 1018; and a recognition circuit for recognizing the serial interface apparatus.

The signal line group 1014 includes the external computer apparatus 1012, the address bus and the memory control signal line, and connected to the data bus, the address bus and the memory control signal line for the data storage memory 1004 in the portable terminal 1001 through the ASIC 1011.

When the PCMCIA standard female connector 1010 in the portable terminal 1001 is connected to the external computer apparatus 1012 by the user, the switching control circuit in the ASIC 1011 outputs the switching signal in response to the power source signal 1013 which is input from the external computer apparatus 1012. When the control signal switching circuit receives the switching signal, the control signal switching circuit switches the address bus, the data bus and the memory control signal line from the CPU 1008, to the address bus, the data bus and the memory control signal line from the external computer apparatus 1012. As a result, the access from the CPU 1008 to the data storage memory 1004 is halted so that it can be accessed from the external computer apparatus 1012.

Further, when the user removes the portable terminal 1001 from the external computer apparatus 1012, the power source signal becomes open state, and the switching control circuit in the ASIC 1011 outputs the switching signal. When the control signal switching circuit receives the switching signal, the control signal switching circuit switches the address bus, the data bus and the memory control signal line from the external computer apparatus 1012, to the address bus, the data bus and the memory control signal line from the CPU 1008. As a result, the access from the external computer apparatus 1012 to the data storage memory 1004 is halted so that it can be accessed from the CPU 1008.

In FIG. 11, the PCMCIA standard female connector 1010 of the portable terminal 1001 is connected to the PCMCIA standard male connector in the serial interface apparatus 1018.

After the recognition circuit in the ASIC 1011 detects the connection to the serial interface apparatus 1018, the serial signal switching circuit in the ASIC 1011 switches the PCMCIA control signal line to the serial signal line 1019, and the CPU 1008 performs serial data communication with the serial interface apparatus 1018 through the serial/parallel converting circuit 1020.

Further, the serial interface apparatus 1018 is connected to a serial port of the external computer apparatus 1012 through an RS-232C interface (see FIG. 5). As a result, the portable terminal 1001 according to the present invention can perform serial data communication with the external computer apparatus 1012 through the serial interface apparatus 1018.

When the PCMCIA standard female connector 1010 in the portable terminal 1001 is connected to the serial interface apparatus 1018, the recognition circuit in the ASIC 1011 recognizes the serial interface apparatus 1018 in response to the input signal from serial interface apparatus 1018. The recognition algorithm for recognizing the serial interface apparatus 1018 will be explained below.

The recognition steps for recognizing the serial interface apparatus 1018 are explained with reference to FIG. 11. The following explanations are given in the operations after the portable terminal 1001 was inserted to the serial interface apparatus 1018. In the following steps, items (1), (3), (5), (7) and (8) are related to the operations in the portable terminal 1001. On the other hand, items (2), (4), (6) and (8) are related to the operations in the serial interface apparatus 1018.

(1) In the portable terminal 1001, terminals CD1 and CD2, which are provided in the PCMCIA standard female connector 1010 for recognizing insertion of the PCMCIA card by the external computer apparatus, are fixed to "L" level.

(2) In the serial interface apparatus 1018, when the terminals CD1 and C2 are fixed to "L" level, an REG signal for separating an attribute memory area and a common memory area in the PCMCIA, an MEMR signal as a memory read strobe signal, and an MEMW signal as a memory write strobe signal are set to "L" level. Further, terminals CE1 and CE2, which indicate access of the PCMCIA card in the external computer apparatus, are set to "H" level. Addresses A0 to A15 are previously fixed to "A5A5h". The voltage 5V is supplied thereto.

(3) In the portable terminal 1001, for "IO address 70h" in the CPU 1008, a PCPWR flag indicating supply of the power from the PCMCIA to the portable terminal, and an SRLEN flag indicating insertion of the portable terminal to the serial interface apparatus, are set to "1", and interruption is executed in the CPU 1008. After interruption, the CPU 1008 recognizes the signal PCMWR=1 and the signal SRLEN=1, after 0.5 second. "IO address 70h" (bit=0) is operated in order to raise once a signal BVD=1 which indicates battery state in the portable terminal. After above steps the bit is fixed to "H" level. When SRLEN=0, the signal is OFF since the portable terminal is inserted to the personal computer PC. When PCPWR=0, it is determined as the PCMCIA standard female connector 1010 is removed.

(4) The serial interface apparatus 1018 sets another signal level to fixed state, and sets the address to A0–A15= 5B5Bh.

(5) In the portable terminal 1001, a circuit in the ASIC 1011 temporally sets the SRLEN flag to "0". After recognition of PCPWR=1 and SRLEN=0, "IO address 70h" (bit=0) is operated in order to rise once again the signal BVD=1. After above steps the bit is fixed to "H" level. When SRLEN=0, the signal is OFF since the portable terminal is inserted to the PC. When PCPWR=0, it is determined as the PCMCIA standard female connector 1010 is removed.

(6) The serial interface apparatus 1018 sets another signal level to fixed state, and sets the REG to "H".

(7) In the portable terminal 1001, the circuit in the ASIC 1011 again sets the SRLEN flag to "1". The G/A switches a part of the PCMCIA terminal to serial communication based on SRLEN=1 in twice. The CPU 1008 finally recognizes PCPWR=1 and SRLEN=1, and sets communication mode. When SRLEN=0, the signal is OFF since the portable terminal is inserted to the PC. When PCPWR=0, it is determined as the PCMCIA standard female connector 1010 is removed.

(8) The serial communication is started.

In the third embodiment of the present invention, when the personal computer which has no PCMCIA standard slot is used as the external computer apparatus, it is possible to perform the serial data communication with the personal computer through the serial interface apparatus when the personal computer has an RS-232C serial board.

Further, when the portable terminal 1001 is connected to either the external computer apparatus 1012 or the serial interface apparatus 1018, the power source switching unit 1015 switches the built-in battery 1006 to either the external computer apparatus 1012 or the serial interface apparatus 1018 in response to the power source signal 1013 which is output from either the external computer apparatus 1012 or the serial interface apparatus 1018, so that it is possible to save power consumption from the built-in battery.

Figure 12:
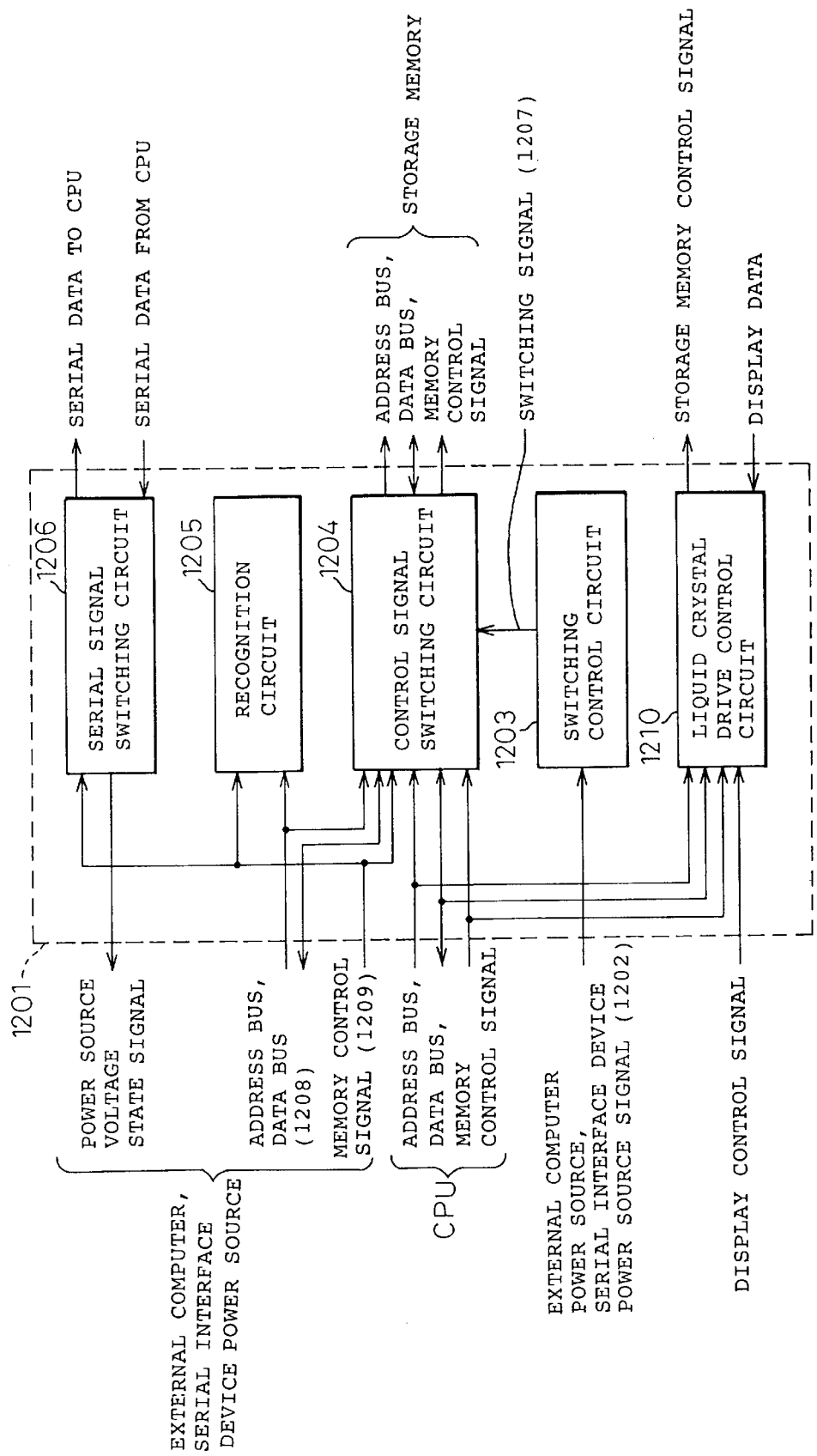
FIG. 12 is a block diagram of an ASIC according to the third embodiment of the present invention.

FIG. 12 is a block diagram of the ASIC according to the third embodiment of the present invention. The power source signal 1202, which is input from either the external computer apparatus 1012 or the serial interface apparatus 1018, is input to the switching control circuit 1203 in the ASIC 1201. The switching control circuit 1203 outputs the switching signal 1207 to the control signal switching circuit 1204, and the bus is switched between the storage memory 1004 and the CPU 1008.

Further, when the portable terminal 1201 (1001) is connected to the serial interface apparatus 1018, the power source signal 1202 is input to the switching control circuit 1203, and the switching signal 1207 is output to the control signal switching circuit 1204. Further, the recognition signal, which is output from the serial interface apparatus 1018, is input through the address bus/data bus 1208 and the memory control signal line 1209 of the PCMCIA standard female connector. As a result, the recognition circuit 1205 in the ASIC 1201 recognizes the serial interface apparatus 1018 in accordance with the above-mentioned recognition procedures. The serial signal, which is input and output to and from the serial interface apparatus 1018, is also input and output to and from the CPU 1008 through the serial/parallel conversion circuit 1020.

Figure 13:
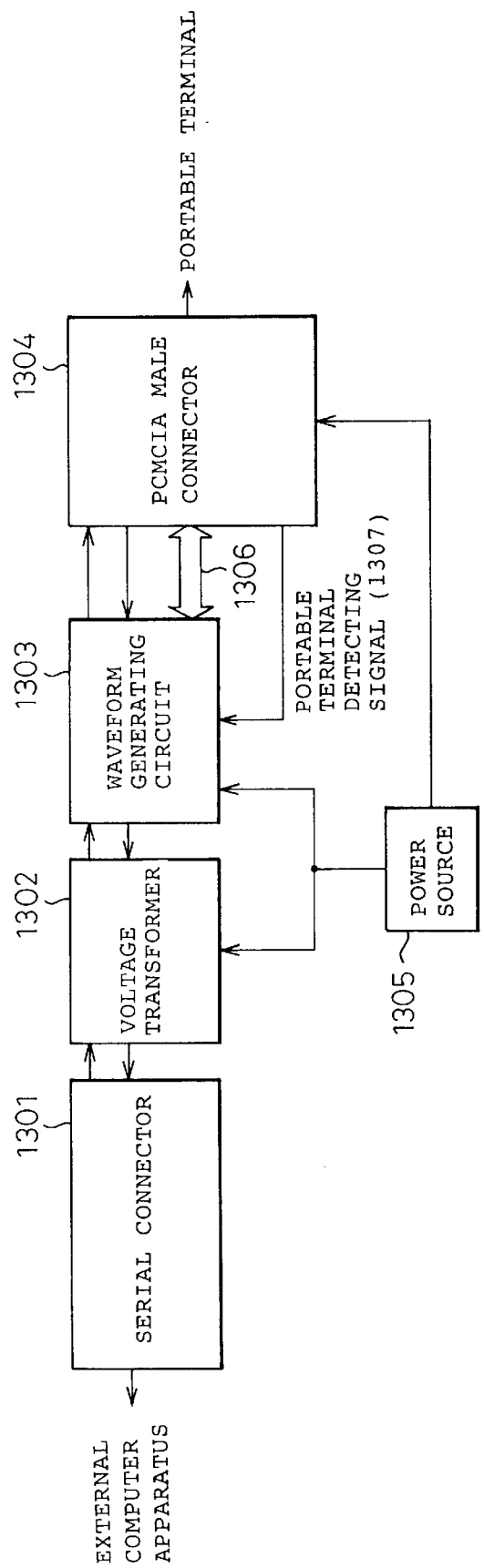
FIG. 13 is a block diagram of one example of a serial interface apparatus connected to the portable terminal according to the present invention.
Figure 14:
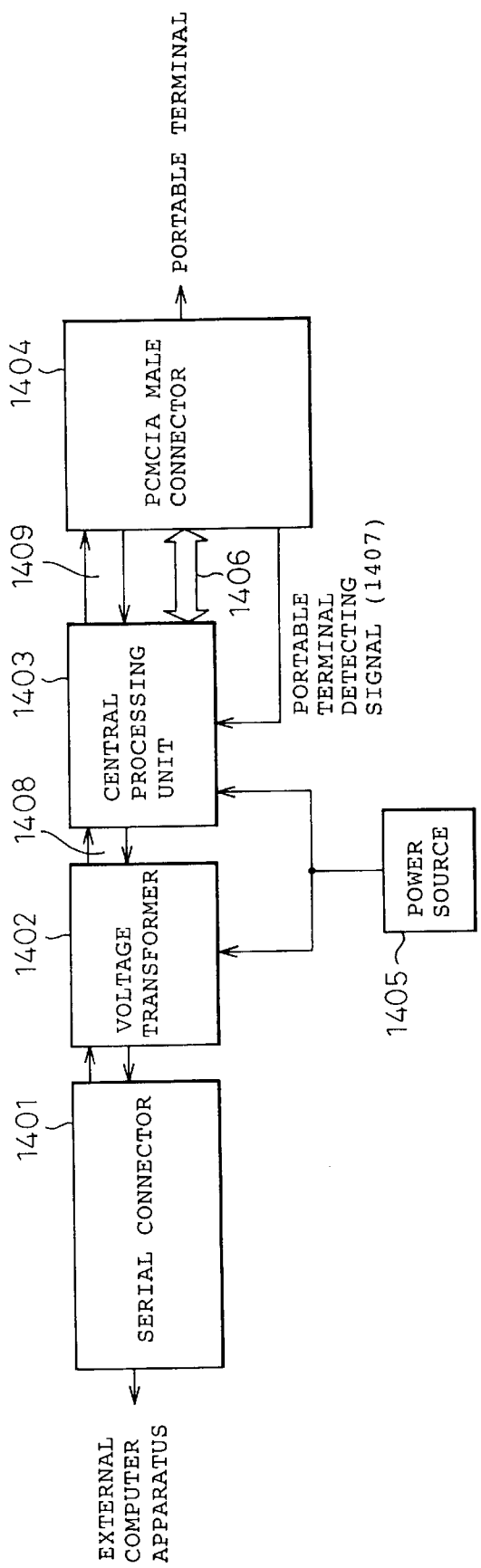
FIG. 14 shows one example using a central processing unit (CPU) instead of a waveform generating circuit 1303 shown in FIG. 13.

FIG. 13 is a block diagram of one example of the serial interface apparatus connected to the portable terminal according to the present invention. Further, FIG. 14 is a block diagram of another example of the serial interface apparatus connected to the portable terminal according to the present invention. The circuit arrangement will be explained with reference to the drawing.

The serial interface apparatus includes a serial connector 1301 having either D-sub 9 pins or D-sub 25 pins, a voltage conversion circuit 1302 converting a signal level of the RS-232C to a signal level of 5V, a waveform generating circuit 1303, the PCMCIA standard male connector 1304 and the power source unit 1305. The PCMCIA standard female connector in the portable terminal according to the present invention is connected to the PCMCIA standard male connector 1304, and the external computer apparatus is connected to the serial connector 1301.

When the PCMCIA standard female connector is connected to the PCMCIA standard male connector 1304, the power source signal 1305 is supplied from the power source unit 1305 to the PCMCIA standard male connector 1304. At the same time, the recognition signal 1306 and a detection signal 1307 are input to the waveform generating circuit 1303 from the portable terminal through the PCMCIA standard male connector 1304. As a result, the serial interface apparatus is recognized between the portable terminal and the waveform generating circuit 1303, in accordance with the above-mentioned recognition procedures ((1) to (8)). When the recognition is completed, it is possible to perform the serial data communication between the portable terminal and the external computer apparatus through the serial interface apparatus.

Further, in FIG. 14, the central processing unit (CPU) is used instead of the waveform generating circuit 1303 shown in FIG. 13. As mentioned above, the serial interface apparatus includes the serial connector 1401 having either D-sub 9 pins or D-sub 25 pins, the voltage conversion circuit 1402 converting the signal level of the RS-232C to the signal level of 5V, the CPU 1403, the PCMCIA standard male connector 1404 and the power source unit 1405. The PCMCIA standard female connector in the portable terminal according to the present invention is connected to the PCMCIA standard male connector 1404, and the external computer apparatus is connected to the serial connector 1401.

As well as the procedures in FIG. 13, when the PCMCIA standard female connector is connected to the PCMCIA standard male connector 1404, the power source signal 1405 is supplied from the power source unit 1405 to the PCMCIA standard male connector 1404. At the same time, the recognition signal 1406 and the detection signal 1407 are input to the CPU 1403 from the portable terminal through the PCMCIA standard male connector 1404. As a result, the serial interface apparatus is recognized between the portable terminal and the waveform generating circuit 1403, in accordance with the above-mentioned recognition procedures ((1) to (8)). When the recognition is completed, it is possible to perform serial data communication between the portable terminal and the external computer apparatus through the serial interface apparatus.

As mentioned above, when the CPU is used, it is possible to transmit and receive the serial data signal having different data bit length and transfer rate between the output signal and the input signal in the CPU. That is, by converting a protocol between the CPU and the portable terminal by using software, it is possible to transmit and receive the serial data signal having different data bit length and transfer rate between the portable terminal and the serial interface apparatus, and between the external computer apparatus and the serial interface apparatus.

FIG. 15(b) is a schematic front view of the portable terminal according to the present invention, and FIG. 15(a) is a schematic side view along A—A cross-sectional view in FIG. 15(b). As shown in the drawings, there is a circuit substrate 1503 mounting circuit parts 1504 on one surface, and a liquid crystal display panel 1502 is bonded opposite to the surface mounted by the circuit parts 1504 on the circuit substrate 1503. Further, as shown in the drawing, the portable terminal is formed by five layers in which the circuit substrate 1503, the circuit parts 1504 and the liquid display panel 1502 are sandwiched between a top cover 1501 and a bottom cover 1505. Further, the PCMCIA standard female connector 1506, the built-in battery 1507, and the input key 1508 are arranged to both ends of the circuit substrate 1503. The built-in battery is mounted or removed by opening a battery supporter 1509.

As mentioned in FIG. 1, the outer size of the portable terminal according to the present invention is defined based on the type II in PCMCIA standard or JEIDA standard, and has the size of length (54.1±0.1 mm)×width (85.6±0.2 mm)×thickness (5.0 mm). Accordingly, the cross-sectional surface in FIG. 15(a) has the thickness of 5.0 mm or less, and the length and width are also defined within the above size.

Further, although a non-volatile memory is used as the data storage memory of the portable terminal according to the present invention, it is possible to use a flash memory, an EEPROM, etc. Further, at the change of the battery, it is possible to provide a memory power source circuit which can hold the contents of the memory, or to utilize an SRAM which can read and write data with high speed if there is no problem if the data is erased when the battery is changed.

When the flash memory is used as the data storage memory in the portable terminal according to the present invention, it is possible to use a part of memory sector as an area of the programming ROM.

Further, a mask ROM or a flash memory can be used as the programming ROM in the portable terminal according to the present invention. When the flash memory is used, it is possible to rewrite the current program to the newest program by transferring the program from the external computer apparatus to the programming ROM through the PCMCIA standard female connector.

Further, the built-in battery in the portable terminal according to the present invention is formed of lithium coin type primary batteries in which two pieces are connected in series. When the SRAM is used as the storage memory, a power backup circuit is provided in order to hold the contents of the memory even if two batteries are changed one by one. As mentioned above, although the lithium coin type primary battery is used as the built-in battery in the present invention, it is possible to combine if with one or more kinds of batteries in the lithium coin type primary battery, a lithium ion secondary battery, or a solar battery. Further, when using the secondary battery, it is possible to utilize the external computer apparatus, or the serial interface apparatus, or the solar battery, as a power source used for charging.

Further, the STN monochrome reflection type is used in the liquid crystal display panel in the portable terminal according to the present invention, it is possible to utilize an STN color reflection type, or a TFT/MIM reflection or a half-transmission type as the liquid crystal display panel.

POSSIBILITY OF UTILIZATION IN INDUSTRY

As mentioned above, there are various merits in the present invention. That is, (1) Since the portable terminal according to the present invention is the business card size defined by the PCMCIA standard, it is convenient for portable, and it is possible to easily input the newest data into the portable terminal by connecting the portable terminal to the external computer apparatus having the PCMCIA standard slot and by transferring the newest data stored in the external computer apparatus to the data storage memory in the portable terminal.

(2) Further, even if the external computer apparatus has no PCMCIA standard slot, it is possible to easily input the newest data into the portable terminal without troublesome for the user, by connecting the portable terminal to the serial port of the external computer apparatus and by transferring the newest data stored in the external computer apparatus to the data storage memory in the portable terminal.

(3) Further, when connecting to the external computer apparatus and inputting the data therefrom, it is possible to save the power consumption of the built-in battery in the portable terminal by using the power source signal from either the external computer apparatus or the serial interface apparatus.

Accordingly, the present invention can be utilized in various fields so that it has high possibility of utilization in industry.

What is claimed is:

1. A portable information terminal electrically connectable to external computer apparatus via a connector such that said external computer apparatus can access said portable information terminal, comprising:

an internal memory for receiving information stored in a memory in said external computer apparatus and storing the same in said internal memory following access by said external computer apparatus;

a central processing unit capable of accessing said internal memory;

display means for displaying said information stored in said internal memory;

first control means for enabling said external computer apparatus to access said internal memory; and said internal memory and said central processing unit being separately connected to said first control means;

wherein access from said central processing unit to said internal memory is prevented and access from said external computer apparatus to said internal memory is enabled when said external computer apparatus and said portable information terminal are connected.

2. A portable information terminal as claimed in claim 1, further comprising:

a power source; and a power source switching circuit for switching said power source of said portable information terminal to a power source of said external computer apparatus when said external computer apparatus and said portable information terminal are connected.

3. A portable information terminal as claimed in claim 1, further comprising a PCMCIA standard female connector for connecting the portable information terminal to said external computer apparatus.

4. A portable information terminal as claimed in claim 1, wherein said internal memory comprises an SRAM or a flash memory.

5. A portable information terminal as claimed in claim 1, wherein said display means comprises a monochrome reflection liquid crystal display panel or a color reflection liquid crystal display panel.

6. A portable information terminal as claimed in claim 1, wherein said first control means comprises a switching circuit which prevents said central processing unit from accessing said internal memory by outputting a switching signal following an input signal from said external computer apparatus.

7. A portable information terminal as claimed in claim 1, wherein said first control means prevents said central processing unit from accessing said internal memory when a power source signal input is received from said external computer apparatus.

8. A portable information terminal as claimed in claim 6, wherein said switching circuit outputs said switching signal based on a power source signal as the input signal from said external computer apparatus.

9. A portable information terminal as claimed in claim 2, wherein said first control means is included in an ASIC which is formed as a one-chip semiconductor.

* * * * *